United States Patent [19]
Stephens

[11] Patent Number: 5,988,385
[45] Date of Patent: Nov. 23, 1999

[54] FRYING PAN PROTECTOR

[76] Inventor: John Stephens, 348 Minahen St., Napa, Calif. 94559

[21] Appl. No.: 08/892,450

[22] Filed: Jul. 14, 1997

[51] Int. Cl.⁶ .................................................. B65D 21/04
[52] U.S. Cl. ............................ 206/516; 206/821; 99/422
[58] Field of Search ................................. 206/514, 516, 206/821, 515; 99/422

[56] References Cited

U.S. PATENT DOCUMENTS

| | | | |
|---|---|---|---|
| 3,164,285 | 1/1965 | Melich | 206/821 X |
| 4,508,768 | 4/1985 | Kornely et al. | 206/516 X |
| 5,048,688 | 9/1991 | Hicks, Jr. | 206/821 X |

FOREIGN PATENT DOCUMENTS

| | | | |
|---|---|---|---|
| 90/00875 | 7/1989 | France | 206/821 |

*Primary Examiner*—Reginald L. Alexander
*Attorney, Agent, or Firm*—Jack Lo

[57] ABSTRACT

Stacking frying pans on top of each other tends to damage their non-stick coatings. Accordingly, a frying pan protector comprises a concave dish positioned between two stacked frying pans. The dish is made of a sufficiently yielding material to prevent scratching the non-stick surface on the bottom pan. The top surface of the protector is shaped to conform to the underside of the top frying pan. Spacers projecting from the bottom of the dish elevates it so that it supports the underside of the top frying pan. The spacers also minimize the surface area in contact with the non-stick coating on the bottom frying pan for further reducing the possibility of damage.

3 Claims, 1 Drawing Sheet

FRYING PAN PROTECTOR

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates generally to frying pans.

2. Prior Art

The cooking surface of frying pans typically include a non-stick coating of polytetrafluoroethylene, sold under the trademark TEFLON. The non-stick coating prevents food from sticking to the pan, but it is easily damaged. Frying pans are often conveniently stacked on top of each other for compact storage. However, the rough underside the frying pan on top tends to scratch or abrade the non-stick coating of the frying pan on the bottom. Repeated stacking causes the coatings to wear off, so that food sticks to the pans during cooking.

OBJECTS OF THE INVENTION

Accordingly an object of the present invention is to provide a frying pan protector for protecting the non-stick coating on stacked frying pans or other cookware.

Another object of the present invention is to provide a frying pan protector that properly supports the pan on top.

Still another object of the present invention is to provide a frying pan protector that minimizes a surface area in contact with the non-stick coating on the bottom pan for further reducing wear thereon.

Further objects of the present invention will become apparent from a consideration of the drawings and ensuing description.

BRIEF SUMMARY OF THE INVENTION

A frying pan protector comprises a concave dish positioned between two stacked frying pans. The dish is soft enough to prevent scratching the non-stick coating on the bottom pan. The protector includes a top surface shaped to conform to the underside of the top frying pan. Protruding spacers arranged on the bottom of the dish elevates the dish so that it engages the underside of the top frying pan. The spacers also reduce the surface area in contact with the bottom frying pan for further minimizing wear on the non-stick surface.

DRAWING REFERENCE NUMERALS

| 10. Pan Protector | 11. Dish |
| 12. Top Surface | 13. Bottom Surface |
| 14. Spacer | 15. Spacer |
| 16. Frying Pan | 17. Frying Pan |
| 18. Gap | |

DETAILED DESCRIPTION OF THE INVENTION

Figure 1:
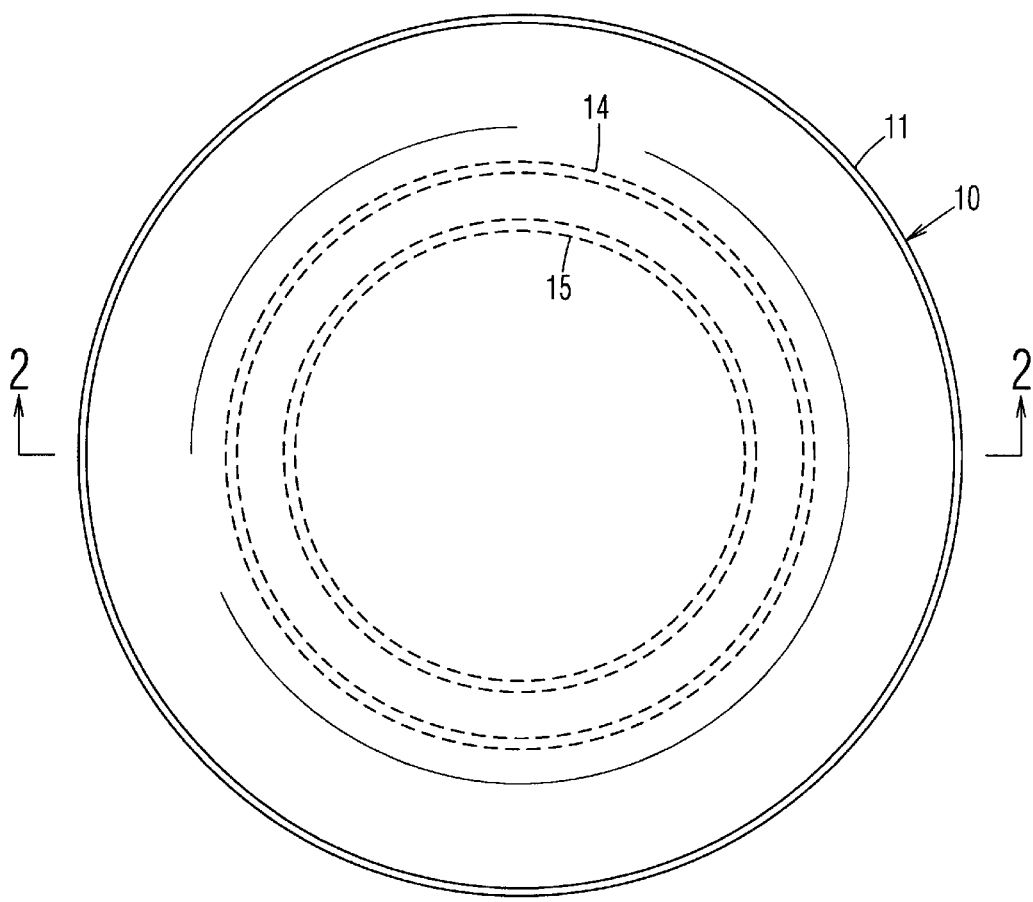
FIG. 1 is a top view of a frying pan protector in accordance with the invention.
Figure 2:
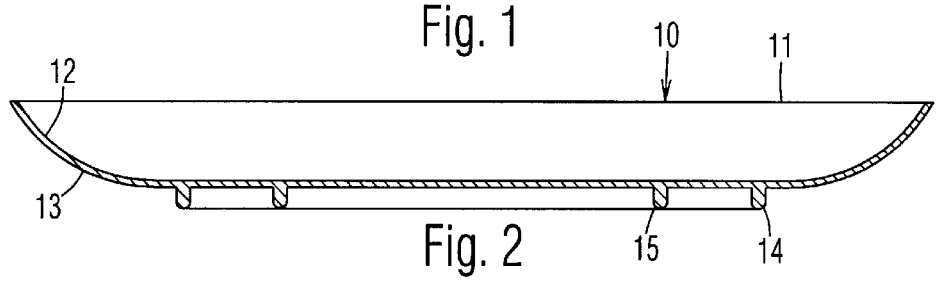
FIG. 2 is a side sectional view of the frying pan protector.

In accordance with a preferred embodiment of the invention shown in the top view of FIG. 1 and the side sectional view of FIG. 2, a frying pan protector 10 comprises a concave dish 11 made of a sufficiently yielding material, such as a soft plastic or rubber. Dish 11 includes a concave top surface 12 and a convex bottom surface 13. Protruding spacers 14 and 15, which are preferably concentric rings, are arranged on bottom surface 13.

Figure 3:
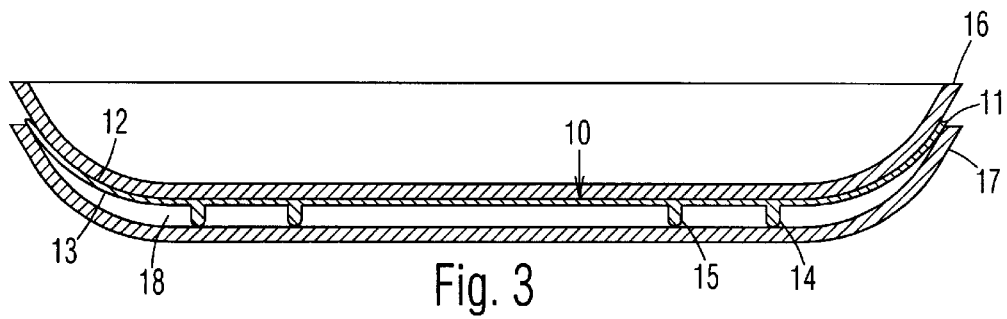
FIG. 3 is a side sectional view of the frying pan protector in use between stacked frying pans.

Pan protector 10 is shown in use between a pair of stacked frying pans 16 and 17 in FIG. 3. When stack, a gap 18 is formed between pans 16 and 17. Spacers 14 and 15 elevate dish 11 for substantially preventing dish 11 from contacting the cooking surface of bottom pan 17, and so that top surface 12 of dish 11 supports the underside of top pan 16 for stability. Top surface 12 is shaped and sized to conform to the underside of top pan 16. Dish 11 is soft enough to prevent scratching the non-stick coating on bottom pan 17. The rounded tips of spacers 14 and 15 are substantially smaller in surface area than bottom surface 13, so that they minimize the surface area in contact with bottom pan 17 for further reducing wear on the non-stick coating.

SUMMARY AND SCOPE

Accordingly, I have provided a frying pan protector for protecting the non-stick coating on stacked frying pans. It properly supports the pan on top for stability, and it minimizes the surface area in contact with the non-stick coating on the bottom pan for further reducing the possibility of damage.

Although the above descriptions are specific, they should not be considered as limitations on the scope of the invention, but only as examples of the embodiments. Many substitutes and variations are possible within the teachings of the invention. For example, the dish can be provided in other sizes for protecting frying pans of other sizes. Instead of round, the dish can be of other shapes, such as square or rectangular, for fitting pans of other shapes. The dish may be flat instead of concave. More or fewer spacers may be provided. The spacers may be of other shapes, such as straight ribs, or an array of protruding nubs. The pan protector can be made of any suitable yielding material, such as nylon or vinyl. The top surface of the pan protector may be made of a more rigid material, such as hard plastic or metal, and the spacers may be made of a yielding material, such as soft plastic or rubber. The spacers may be eliminated, so that the pan protector relies on a yielding bottom surface for engaging the bottom pan. The pan protector can be used for protecting other cookware, such as pots, glass cookware, ceramic cookware, or baking sheets. Therefore, the scope of the invention should be determined by the appended claims and their legal equivalents, not by the examples given.

I claim:

1. A frying pan protector, comprising:

a dish for being positioned between a pair of frying pans stacked one on top of another; and a plurality of concentric protruding rings extending downwardly from a bottom surface of said dish, said protruding rings elevating said dish for substantially preventing said dish from contacting a cooking surface of the bottom frying pan, said protruding rings each having a surface area substantially smaller than a surface area of said bottom surface of said dish for minimizing wear on the cooking surface.

2. A frying pan protector, comprising:

a dish having a concave top surface and a convex bottom surface, said dish for being positioned between a pair of frying pans stacked one on top of another; and a protruding ring extending downwardly from said convex bottom surface of said dish, said protruding ring elevating said dish for substantially preventing said dish from contacting a cooking surface of the bottom frying pan, said protruding ring having a surface area substantially smaller than a surface area of said convex bottom surface of said dish for minimizing wear on the cooking surface.

3. A frying pan protector, comprising:

a dish having a concave top surface and a convex bottom surface, said dish for being positioned between a pair of frying pans stacked one on top of another; and plurality of concentric protruding rings extending downwardly from said convex bottom surface of said dish, said protruding rings elevating said dish for substantially preventing said dish from contacting a cooking surface of the bottom frying pan, said protruding rings each having a surface area substantially smaller than a surface area of said convex bottom surface of said dish for minimizing wear on the cooking surface.

* * * * *